Figure 1:
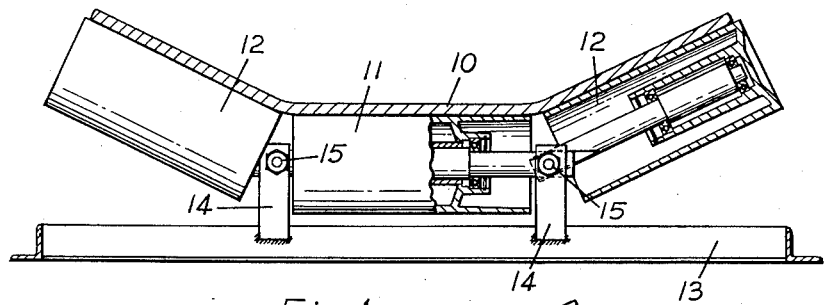

July 9, 1963

L. C. WOOLDRIDGE 3,096,874

BELT SUPPORTING ROLLERS FOR ENDLESS BELT CONVEYORS

Filed Feb. 8, 1961

2 Sheets-Sheet 1

Inventor
Lawson Clarence Wooldridge
By Kenway, Jenney & Hildreth
Attorneys

July 9, 1963 L. C. WOOLDRIDGE 3,096,874
BELT SUPPORTING ROLLERS FOR ENDLESS BELT CONVEYORS
Filed Feb. 8, 1961 2 Sheets-Sheet 2

Inventor
Lawson Clarence Wooldridge
By Kenway, Jenney & Hildreth
Attorneys

United States Patent Office 3,096,874
Patented July 9, 1963

3,096,874
BELT SUPPORTING ROLLERS FOR ENDLESS
BELT CONVEYORS
Lawson Clarence Wooldridge, Stourbridge, England, assignor to Brockway Engineering Co. Limited, Stourbridge, England, a company of the United Kingdom of Great Britain and Northern Ireland
Filed Feb. 8, 1961, Ser. No. 87,900
Claims priority, application Great Britain Jan. 6, 1961
6 Claims. (Cl. 198—192)

This invention has reference to improvements relating to belt supporting rollers for endless belt conveyors and is concerned particularly with improvements relating to belt supporting rollers for belt conveyors which are either of a trough cross-section or else are required to assume a trough cross-section when in use.

It is known practice to support the marginal portions of the belt of an endless belt conveyor of trough cross-section on idler wing rollers mounted on cantilevered spindles. As practised heretofore however it has been necessary to provide supports for the fixed ends of the said cantilevered spindles in the form of cast or pressed steel brackets.

Such brackets however are relatively expensive to produce and require accurate machining in order to enable the spindles to be cantilevered to be set at a predetermined angle.

The present invention has for its object to provide an improved method of manufacturing spindles for supporting rollers for endless belt conveyors which are required to be cantilevered which is relatively low in cost and which is readily adaptable to provide any predetermined angle of inclination required to be possessed by a spindle when cantilevered.

Accordingly the invention consists of an improved method of manufacturing spindles for supporting rollers for endless belt conveyors which are required to be cantilevered which resides in forming the anchorage end portion of each spindle with a machined flat surface and providing the end portion of each spindle for a belt supporting roller which is not required to be cantilevered but which is required to be associated with a cantilevered spindle with a complementary machined flat surface and bounding the machined flat surface on the spindle to be cantilevered by a shoulder resulting from the machining which is adapted to bear on the periphery of the said complementary spindle when fitted thereto with the machined flat surfaces in abutment and the spindle under load whereby after the bringing of the machined flat surfaces into abutment as aforesaid and the passage of a locating member through the abutting portions a cantilevered action is engendered in the spindle which is required to be cantilevered, when this is under load, said shoulder being machined at an angle corresponding to a predetermined angle of inclination required to be given to the cantilevered spindle.

The invention also resides in a method of manufacturing spindles for supporting rollers for endless belt conveyors which are required to be cantilevered substantially as will be described hereinafter.

The invention still further resides in endless belt conveyors whenever incorporating cantilevered supporting rollers substantially as will be described hereinafter.

Embodiments of the invention will now be described with particular reference to the accompanying drawings which illustrate the invention as applied to endless belt conveyors employing trough section belts which are required to be supported by a plurality of sets of idler rollers.

Figure 2:
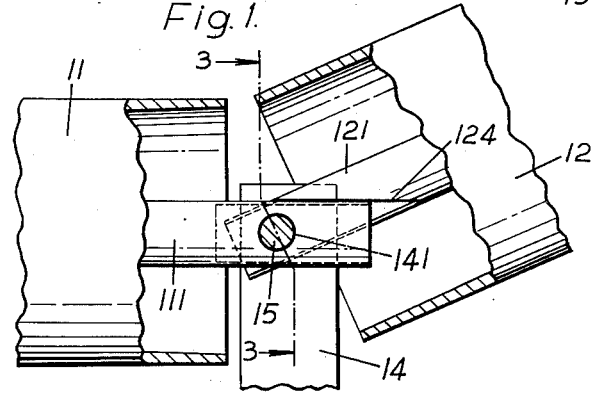
Figure 3:
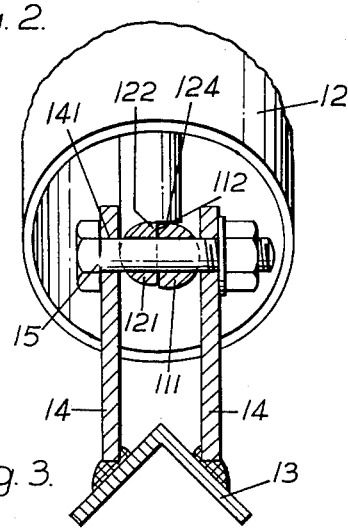
Figure 4:
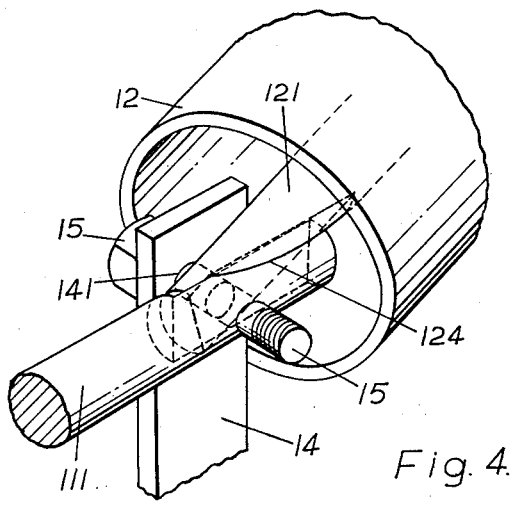
Figure 5:
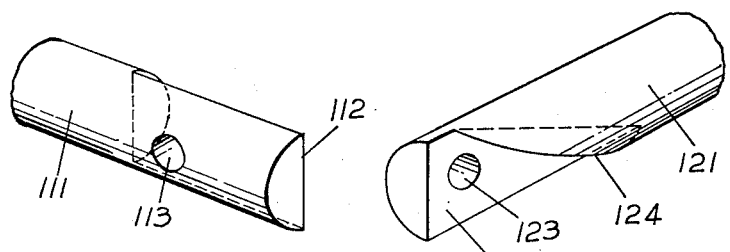
Figure 6:
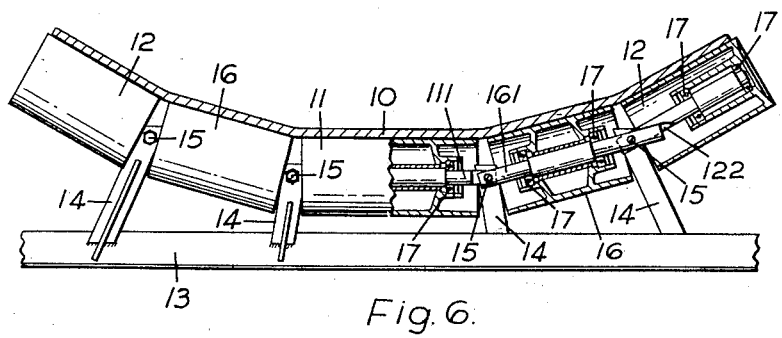

In the drawings:

FIGURE 1 is a view mainly in front elevation but partly in section illustrating an embodiment of the invention in which the trough section conveyor belt is required to be supported by sets of idler rollers each set of which incorporates a central roller and a pair of oppositely disposed upwardly and outwardly inclined cantilevered idler wing rollers, FIGURE 2 is a fragmentary view on an enlarged scale partly in section illustrating the manner of cantilevering the idler wing rollers illustrated in FIGURE 1, FIGURE 3 is a section taken on the planes indicated by the lines 3—3, FIGURE 2, looking in the direction of the arrow to the said line, FIGURE 4 is a fragmentary view in perspective and also on an enlarged scale illustrating in greater detail the manner of cantilevering the wing rollers in the embodiment illustrated in FIGURES 1-3, FIGURE 5 is a fragmentary view illustrating the manner of forming the machined flat surfaces at the outer end portions of the spindles of the cantilevered wing rollers, and FIGURE 6 is a view partly in front elevation and partly in section illustrating an embodiment of the invention in which the trough section conveyor belt is required to be supported by sets of idler rollers, each set of which incorporates a central roller, upwardly and outwardly inclined intermediate rollers disposed on each side of the said central roller and upwardly and outwardly inclined wing rollers which are cantilevered on the outer ends of the spindles of the intermediate rollers and the outer supports therefor. In the drawings like numerals of reference indicate similar or analogous parts in the several views.

According to the embodiment of the invention as illustrated in FIGURES 1 to 5, the trough section belt conveyor 10 is supported on sets of idler rollers comprising a central idler roller 11 and a pair of upwardly and outwardly inclined wing idler rollers 12, the said central and idler rollers 11, 12 are adapted to be supported from a transverse metal base member 13 of inverted V cross section through the medium of pairs of uprights 14 of metal plate which are welded at their lower ends to the respective inclined surfaces of the base member 13 said pairs of uprights 14 being spaced apart at a distance slightly greater than the length of the central roller 11.

Each projecting end portion of the fixed spindle 111 for the central roller 11 is provided with a machined flat surface 112 which is disposed in a vertical plane when the said spindle 11 is mounted in a manner to be referred to hereinafter.

The spindles 121 for the idler wing rollers 12 which are to be located on either side of the central roller 11 are each provided at their inner ends with a machined flat surface 122 which is complementary to the machined flat surface 112 at the ends of the central spindle 111.

The machined flat surfaces 112 of the central spindle 111 and the machined flat surfaces 122 of the spindles 121 are provided with holes 113 and 123 respectively which are adapted to be brought into register with holes 141 formed in the upper end portions of the relevant pairs of uprights 14 so that locating pins 15 common to the central and wing roller spindles 111 and 121 may be passed therethrough.

The flat surfaces 122 on the wing roller spindles 12 are machined so as to provide shoulders 124 which when a locating pin 15 has been passed through the holes 141 in the uprights and through the holes 113 and 123 in the machined flat surfaces 112 and 122 of the central and wing roller spindles 111 and 121, the flat surfaces 112 and 122 are in abutment with the shoulder 124, bounding the machined flat surface 122 on each wing roller spindle 121 bearing on the periphery of the relevant end portion of the central spindle 111 see FIGURES 2 and 4, thus engendering the desired cantilevered action of the spindles 121 for the wing rollers 12 when the said wing rollers 12 are under load.

The machining of the flat surface 122 of the spindles 12 to be cantilevered is effected so that the angle of the shoulders 124 is such that when the said shoulders 124 rest on the relevant end portions of the spindle 111 of the central roller 11 the wing roller spindles 121 are set at the required angle of inclination relatively to the central spindle 111.

In the embodiment of the invention illustrated in FIGURE 6, the trough section endless belt 10 is supported on sets of five idler rollers each set of which incorporates a central roller 11, two upwardly and outwardly inclined intermediate rollers 16 and two wing idler rollers 12 also upwardly and outwardly inclined, the base member 13 is provided with four pairs of uprights 14 constructed and mounted as in the embodiment first described with a pair of such uprights 14 situated at the connection point of the spindles of adjacent pairs of rollers.

The spindles 111 and 161 of the centre and intermediate rollers 11 and 16 are each supported at both ends between the said four pairs of uprights 14 by locating pins 15 passed through holes in the uprights 14 and through holes in the spindles 111 and 161 adjacent to the ends thereof, said spindles 111 and 161 being provided with complementary machined flats whilst the spindles 121 of the wing rollers 12 are provided with shouldered machined surfaces 122 bounded by shoulders 124 as in the embodiment first described.

Thus in the embodiment last described the wing idler rollers 12 are cantilevered from the outer pairs of uprights 14 and the outer ends of the spindles 161 for the intermediate rollers 16 in a manner analogous to that hereinbefore described.

In each of the embodiments described the several rollers 11, 12 and 16 are mounted on their respective spindles 111, 121 and 161 through the medium of ball bearing mountings 17 in accordance with conventional practice and as is clearly seen in FIGURES 1 and 6.

It will be appreciated that the method of manufacturing spindles for the supporting idler rollers of endless belt conveyors which are required to be cantilevered as described hereinbefore is simple, effective and low in production cost and enables such spindles to be produced which can be set at the desired angle of inclination.

I claim:

1. Idler roller sets for supporting the belt of an endless belt conveyor having an intermediate idler roller for supporting the central portion of the belt of the conveyor and wing idler rollers for supporting the marginal portions of the belt of the conveyor, incorporating fixed spindles for the intermediate and wing idler rollers, means for supporting the ends of the spindle of an intermediate idler roller from a base, the spindle of an intermediate idler roller projecting outwardly from the roller and having a flat surface located in a vertical plane at each end portion thereof, a flat surface located in a vertical plane at the inner end portion of the spindle of a wing idler roller which is presented to the flat surface of the spindle of an intermediate idler roller and a shoulder normal to the flat surface on the spindle of a wing idler roller which is formed at a predetermined angle of inclination relatively to the axis of the spindle of the said wing idler roller and a member passing through the flat end portions of the spindles of an intermediate idler roller and its complementary adjacent wing idler roller and through the supporting means for the spindle of the relevant intermediate idler roller after the flat surfaces aforesaid of the respective spindles have been brought into abutment and with the shoulder on the wing idler roller resting on the periphery of the presented end portion of the spindle of an intermediate idler roller whereby the wing idler rollers are cantilevered from the spindle of an intermediate idler roller.

2. Idler roller sets for supporting the belt of an endless belt conveyor having an intermediate idler roller or rollers for supporting the central portion of the belt of the conveyor and wing idler rollers for supporting the marginal portions of the belt of the conveyor incorporating fixed spindles for the intermediate and wing idler rollers, a base member, uprights fixed to said base member for supporting the ends of the spindle of an intermediate idler roller, a flat surface located in a vertical plane at each end portion of the spindle of an intermediate idler roller which is adjacent to a wing idler roller, a flat surface located in a vertical plane at the inner end portion of the spindle of a wing idler roller which is presented to the flat surface of the spindle of an intermediate idler roller and a shoulder normal to the flat surface on the spindle of a wing idler roller which is formed at a predetermined angle of inclination relatively to the axis of the spindle of the said wing idler roller and a member passing through the flat end portions of the spindles of an intermediate idler roller and its complementary adjacent wing idler roller and through the supporting means for the spindle of the relevant intermediate roller after the flat surfaces aforesaid of the respective spindles have been brought into abutment and with the shoulder on the wing idler roller resting on the periphery of the presented end portion of the spindle of an intermediate idler roller whereby the wing idler rollers are cantilevered by direct engagement with the spindle of an intermediate idler roller, the angle of the shoulder aforesaid determining the angle at which the spindle of a wing idler roller is cantilevered.

3. Idler roller sets for supporting the belt of an endless belt conveyor having an intermediate idler roller or rollers for supporting the central portion of the belt of the conveyor and wing idler rollers for supporting the marginal portions of the belt of the conveyor incorporating fixed spindles for the intermediate idler and wing idler rollers, a base member, uprights for the ends of the spindle of an intermediate idler roller secured to the said base member, a flat surface located in a vertical plane at each end portion of the spindle of an intermediate idler roller which is required to be adjacent to a wing idler roller, a flat surface located in a vertical plane at the inner end portion of the spindle of a wing idler roller which is presented to the flat surface of the spindle of an intermediate idler roller and a shoulder normal to the flat surface of the spindle of a wing idler roller which is formed at a predetermined angle of inclination relatively to the axis of the spindle of the said wing idler roller and a member passing through the flat end portions of the spindles of an intermediate idler roller and its complementary adjacent wing idler roller and through the supporting means for the spindle of the relevant intermediate roller after the flat surfaces aforesaid of the respective spindles have been brought into abutment and with the shoulder on the wing roller resting on the periphery of the presented end portion of the spindle of an intermediate idler roller whereby the wing idler rollers are cantilevered by direct engagement with the spindle of an intermediate idler roller the angle of the shoulder aforesaid determining the angle at which the spindle of a wing idler roller is cantilevered.

4. Idler roller sets for supporting the belt of an endless conveyor having a central idler roller for supporting the central portion of the belt of the conveyor and wing idler rollers for supporting the marginal portions of the belt of the conveyor, incorporating a fixed spindle for the central idler roller and a fixed spindle for each wing idler roller, means for supporting the ends of the spindle of the central idler roller from a base, a flat surface located in a vertical plane at each end portion of the spindle of the central idler roller, a flat surface located in a vertical plane at the inner end portion of each spindle of a wing idler roller and a shoulder normal to the flat surface of the spindle of each wing idler roller which is formed at a predetermined angle of inclination relatively to the axis of the wing idler roller and a member passing through the flat end portions of the spindle of the central idler roller and the complementary flat end portions of the spindles of the adjacent wing idler roller and through the supporting means for the respective end of the spindle of the central idler roller after the flat surfaces of the respective wing idler roller and of the presented end of the spindle of the central idler roller have been brought into abutment and with the shoulder of a wing roller resting on the periphery of the presented end portion of the spindle of the central idler roller whereby the wing idler rollers are directly cantilevered from the spindle of the central idler roller, the angle of the shoulder aforesaid determining the angle at which the spindles of the wing rollers are cantilevered from the spindle of the central roller.

5. Idler roller sets for supporting the belt of an endless belt conveyor having a plurality of intermediate idler rollers for supporting the central portion of the belt of the conveyor and wing idler rollers for supporting the marginal portions of the belt of the conveyor incorporating fixed spindles for the intermediate and wing idler rollers, supports for the ends of the spindle of each intermediate idler roller, a flat surface located in a vertical plane at each end portion of the spindle of an intermediate idler roller which is presented to the end portion of the spindle of an adjacent intermediate idler roller, members passing through the flat end portions of the spindles of the intermediate rollers and through the relevant supports therefor when the said flat surfaces have been brought into abutment, a flat surface located in a vertical plane at each end portion of the spindle of an intermediate roller which is adjacent to a wing idler roller, a flat surface located in a vertical plane at the inner end portion of the spindle of a wing idler roller which is presented to the flat surface of the spindle of an intermediate idler roller and a shoulder normal to the flat surface of the spindle of a wing idler roller which is formed at a predetermined angle of inclination relatively to the axis of the spindle of the said wing idler roller and a member passing through the flat end portions of the spindles of an intermediate idler roller and its complementary adjacent wing idler roller and through the supporting means for the spindle of the relevant intermediate idler roller after the flat surfaces aforesaid of the respective spindles have been brought into abutment and with the shoulder on the wing idler roller resting on the periphery of the presented end portion of the spindle of an intermediate idler roller whereby the wing idler rollers are directly cantilevered from the spindle of the adjacent intermediate idler roller, the angle of the shoulder aforesaid determining the angle at which the spindle of a wing idler roller is cantilevered.

6. A roller set for a trough conveyor belt, comprising an intermediate roller and wing rollers, a stationary spindle for the intermediate roller supported at both ends in horizontal position and cut out at both ends to present vertical flat side faces and adjacent shoulders, and a wing spindle reduced at one end to present a vertical flat side face and an overhanging shoulder inclined with respect to the axis of the spindle, the said spindles being pivotally connected with their flat faces in face-to-face contact, and the inclined shoulder of the wing spindle engaged with the shoulder of the intermediate roller spindle.

References Cited in the file of this patent

UNITED STATES PATENTS

| 169,826 | Melhorn | Nov. 9, 1875 |
| 1,788,102 | Gilbert | Jan. 6, 1931 |

FOREIGN PATENTS

| 5,586 | Great Britain | Mar. 8, 1906 |